(12) United States Patent
Farahmand et al.

(10) Patent No.: US 12,097,734 B2
(45) Date of Patent: Sep. 24, 2024

(54) HYBRID PLANAR ACTIVE ELECTROMAGNETIC SUSPENSION

(71) Applicant: Karma Automotive LLC, Irvine, CA (US)

(72) Inventors: Fazel Farahmand, Aliso Viejo, CA (US); Lucas Rieckhoff, Irvine, CA (US)

(73) Assignee: Karma Automotive LLC, Irvine, CA (US)

(*) Notice: Subject to any disclaimer, the term of this patent is extended or adjusted under 35 U.S.C. 154(b) by 20 days.

(21) Appl. No.: 18/148,848

(22) Filed: Dec. 30, 2022

(65) Prior Publication Data

US 2024/0217295 A1 Jul. 4, 2024

(51) Int. Cl.
| | | |
|---|---|---|
| *B60G 17/015* | (2006.01) | |
| *B60G 13/02* | (2006.01) | |
| *B60G 17/016* | (2006.01) | |
| *H02K 1/14* | (2006.01) | |

(Continued)

(52) U.S. Cl.
CPC ......... *B60G 17/0157* (2013.01); *B60G 13/02* (2013.01); *B60G 17/016* (2013.01); *H02K 1/14* (2013.01); *H02K 3/18* (2013.01); *H02K 11/30* (2016.01); *B60G 2202/16* (2013.01); *B60G 2204/62* (2013.01); *B60G 2206/41* (2013.01); *B60G 2500/10* (2013.01); *B60G 2600/182* (2013.01); *B60G 2600/26* (2013.01); *B60G 2600/73* (2013.01); *B60G 2800/162* (2013.01)

(58) Field of Classification Search
CPC ............... B60G 17/0157; B60G 13/02; B60G 2202/16; B60G 2600/26; B60G 2600/73
See application file for complete search history.

(56) References Cited

U.S. PATENT DOCUMENTS

| | | | |
|---|---|---|---|
| 3,885,504 A | | 5/1975 | Baermann |
| 4,912,343 A | * | 3/1990 | Stuart ................ B60G 17/0157 310/12.32 |

(Continued)

FOREIGN PATENT DOCUMENTS

| | | |
|---|---|---|
| CN | 203902200 U | 10/2014 |
| CN | 103929041 B | 8/2016 |

(Continued)

*Primary Examiner* — Frank B Vanaman
(74) *Attorney, Agent, or Firm* — Honigman LLP; Grant Griffith; Thomas Appledorn

(57) ABSTRACT

A suspension includes inner magnets coupled to an inner cylindrical member and outer magnets coupled to an outer cylindrical member that circumscribes the inner cylindrical member. The inner magnets are stacked on top of one another in an axial direction and include a first set having a first polarity alternately arrayed with a second set having a second polarity. The outer magnets are stacked on top of one another in the axial direction and include a first set having the first polarity alternately arrayed with a second set having the second polarity. Each inner magnet in the first set is radially aligned with an outer magnet in the second set and each inner magnet in the second set is radially aligned with an outer magnet in the first set to provide an attractive electromagnetic field between the magnets that passively absorbs axial displacement between the inner and outer cylindrical members.

18 Claims, 11 Drawing Sheets

(51) Int. Cl.
*H02K 3/18* (2006.01)
*H02K 11/30* (2016.01)

(56) References Cited

U.S. PATENT DOCUMENTS

| | | | | |
|---|---|---|---|---|
| 5,263,558 | A * | 11/1993 | Yamaoka | F16F 15/03 |
| | | | | 188/267 |
| 6,952,060 | B2 * | 10/2005 | Goldner | B60G 17/0157 |
| | | | | 310/15 |
| 7,087,342 | B2 | 8/2006 | Song et al. | |
| 7,270,335 | B2 | 9/2007 | Hio et al. | |
| 8,725,351 | B1 | 5/2014 | Selden et al. | |
| 8,941,251 | B2 * | 1/2015 | Zuo | H02K 35/02 |
| | | | | 290/1 R |
| 2005/0052150 | A1 * | 3/2005 | Bender | B60G 13/14 |
| | | | | 318/611 |
| 2006/0181158 | A1 | 8/2006 | Tajima et al. | |
| 2008/0290624 | A1 | 11/2008 | Yamanaka et al. | |
| 2009/0236192 | A1 * | 9/2009 | Takeuchi | F16F 6/00 |
| | | | | 188/267 |
| 2010/0044144 | A1 * | 2/2010 | Tajima | B62D 5/0427 |
| | | | | 180/443 |
| 2012/0217105 | A1 * | 8/2012 | Lee | H02K 41/031 |
| | | | | 188/267 |
| 2015/0167770 | A1 * | 6/2015 | Trangbaek | F16F 6/005 |
| | | | | 280/5.515 |
| 2020/0235651 | A1 * | 7/2020 | Groepper | H02K 41/033 |

FOREIGN PATENT DOCUMENTS

| | | |
|---|---|---|
| IN | 104723818 B | 2/2017 |
| JP | 200453003 A | 2/2004 |
| JP | 2013050172 A | 3/2013 |
| JP | 6025402 B2 | 11/2016 |
| JP | 2020159492 A | 10/2020 |
| WO | 2022092634 A1 | 5/2022 |

* cited by examiner

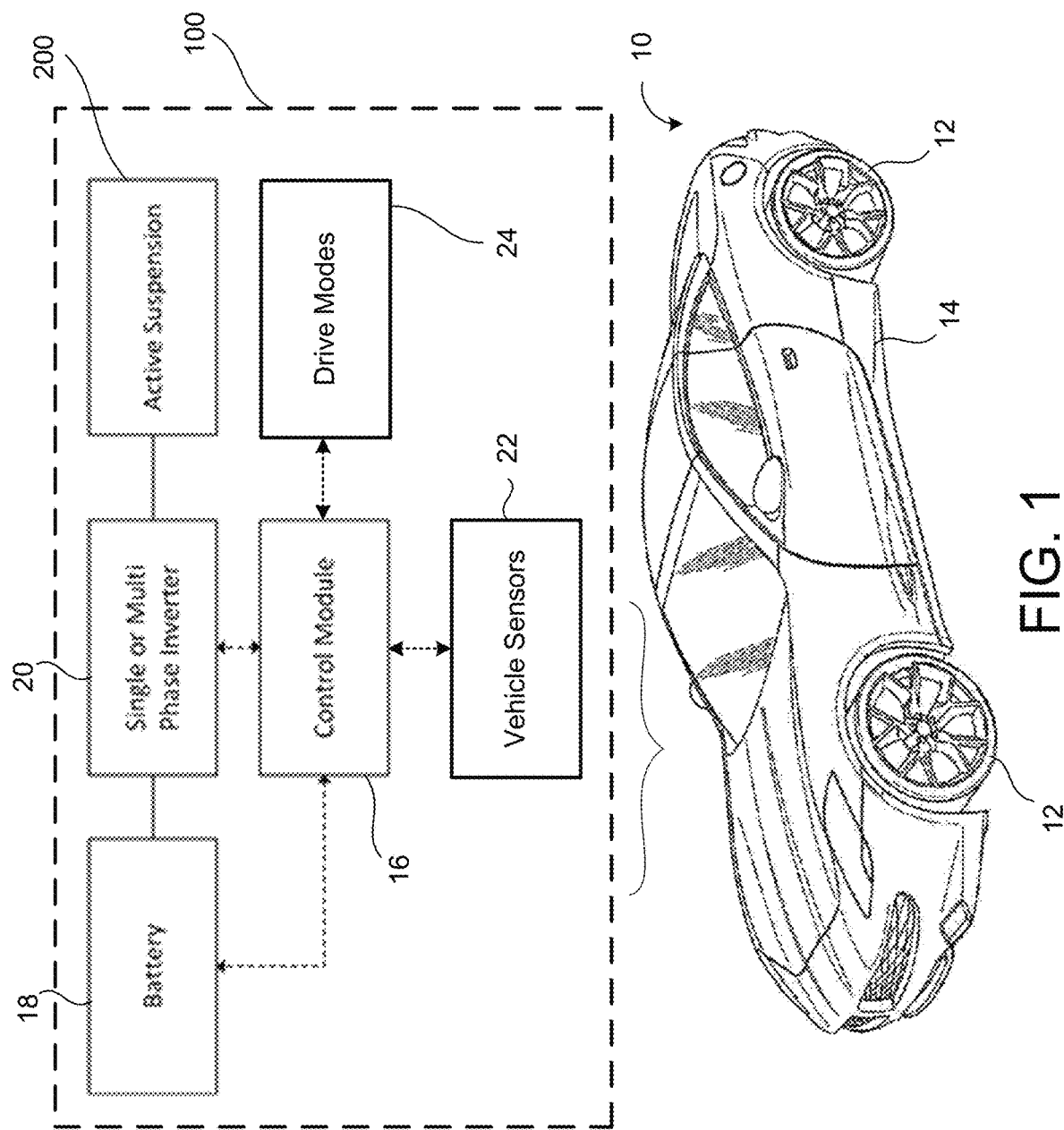

HYBRID PLANAR ACTIVE ELECTROMAGNETIC SUSPENSION

TECHNICAL FIELD

This disclosure relates to hybrid planar active electromagnetic suspensions for vehicles, and more particularly, hybrid planar active electromagnetic suspensions for electric vehicles.

BACKGROUND

It is known to provide a vehicle with an active suspension, where the suspension system of the vehicle continuously adjusts damping of the suspension to react to changes in surface conditions of the road along which the vehicle is travelling. Some conventional active suspensions utilize linear motors. However, these active suspensions rely on a high level of power consumption as electronics must be energized to provide lift and maintain stability of the suspension, and, in the event of power loss or electronic failure, the vehicle experiences a total loss of suspension.

SUMMARY

One aspect of the disclosure provides a hybrid planar active electromagnetic suspension. The suspension includes a plurality of inner magnets coupled to an inner cylindrical member that defines a longitudinal axis. The plurality of inner magnets are axially stacked on top of one another in an axial direction parallel to the longitudinal axis. The plurality of inner magnets include a first set of inner magnets each having a first polarity, and a second set of inner magnets each having a second polarity different than the first polarity. The second set of inner magnets and the first set of inner magnets are alternately arrayed in the axial direction. The suspension includes a plurality of outer magnets coupled to an outer cylindrical member that circumscribes the inner cylindrical member. The plurality of outer magnets are axially stacked on top of one another in the axial direction. The plurality of outer magnets include a first set of outer magnets each having the first polarity, and a second set of outer magnets each having the second polarity. The second set of outer magnets and the first set of outer magnets are alternately arrayed in the axial direction. Each inner magnet in the first set of inner magnets is radially aligned with a respective outer magnet in the second set of outer magnets and each inner magnet in the second set of inner magnets is radially aligned with a respective outer magnet in the first set of outer magnets to provide an attractive electromagnetic field between the inner and outer magnets that passively absorbs displacement between the inner cylindrical member and the outer cylindrical member in the axial direction.

Implementations of the disclosure may include one or more of the following optional features. In some implementations, the inner cylindrical member is coupled to one of a sprung mass or an un-sprung mass and the outer cylindrical member is coupled to the other one of the sprung mass or the un-sprung mass. In further implementations, the sprung mass includes a vehicle body member and the un-sprung mass includes a vehicle wheel.

In some examples, each corresponding inner magnet defines a ring-shape having an inner cylindrical surface radially opposing an outer periphery of the inner cylindrical member, and an outer cylindrical surface. In those examples, each corresponding outer magnet defines a ring-shape having an inner cylindrical surface radially opposing the outer cylindrical member, and an outer cylindrical surface. The inner cylindrical surface of the corresponding outer magnet radially opposes the outer cylindrical surface of the respective inner magnet in the first set of inner magnets or the second set of inner magnets that is radially aligned with the corresponding outer magnet.

In some implementations, the suspension further includes a stator assembly. The stator assembly includes a first set of stator windings disposed along one of the inner cylindrical member or the outer cylindrical member. When disposed along the inner cylindrical member, the first set of stator windings are separated from the inner magnets by a radial flux gap. When disposed along the outer cylindrical member, the first set of stator windings are separated from the outer magnets by a radial flux gap. In those implementations, the suspension includes a first inverter configured to control current supplied from an energy storage device to energize the first set of stator windings to provide an active suspension mode for damping high-frequency vibrations caused by displacements between the inner cylindrical member and the outer cylindrical member in the axial direction.

In further implementations, the first set of stator windings include three-phase or single-phase windings. In other further implementations, the stator assembly includes a second set of stator windings disposed along the other one of the inner cylindrical member or the outer cylindrical member. In other even further implementations, the first inverter is further configured to control current supplied from the energy storage device to energize the second set of stator windings independently from the current supplied to energize the first set of stator windings. In additional even further implementations, the suspension includes a second inverter configured to control current supplied from the energy storage device to energize the second set of stator windings independently from the current supplied to energize the first set of stator windings. The second set of stator windings may include three-phase or single-phase windings.

Another aspect of the disclosure provides a vehicle including a suspension system. The suspension system includes a plurality of inner magnets coupled to an inner cylindrical member that defines a longitudinal axis. The plurality of inner magnets are axially stacked on top of one another in an axial direction parallel to the longitudinal axis. The plurality of inner magnets include a first set of inner magnets each having a first polarity, and a second set of inner magnets each having a second polarity different than the first polarity. The second set of inner magnets and the first set of inner magnets are alternately arrayed in the axial direction. The suspension system includes a plurality of outer magnets coupled to an outer cylindrical member that circumscribes the inner cylindrical member. The plurality of outer magnets are axially stacked on top of one another in the axial direction. The plurality of outer magnets include a first set of outer magnets each having the first polarity, and a second set of outer magnets each having the second polarity. The second set of outer magnets and the first set of outer magnets are alternately arrayed in the axial direction. Each inner magnet in the first set of inner magnets is radially aligned with a respective outer magnet in the second set of outer magnets and each inner magnet in the second set of inner magnets is radially aligned with a respective outer magnet in the first set of outer magnets to provide an attractive electromagnetic field between the inner and outer magnets that passively absorbs displacement between the inner cylindrical member and the outer cylindrical member in the axial direction.

Implementations of the disclosure may include one or more of the following optional features. In some implementations, the inner cylindrical member is coupled to one of a sprung mass of the vehicle or an un-sprung mass of the vehicle and the outer cylindrical member is coupled to the other one of the sprung mass or the un-sprung mass. In further implementations, the sprung mass includes a body member of the vehicle and the un-sprung mass includes a wheel of the vehicle.

In some examples, each corresponding inner magnet defines a ring-shape having an inner cylindrical surface radially opposing an outer periphery of the inner cylindrical member, and an outer cylindrical surface. In those examples, each corresponding outer magnet defines a ring-shape having an inner cylindrical surface radially opposing the outer cylindrical member, and an outer cylindrical surface. The inner cylindrical surface of the corresponding outer magnet radially opposes the outer cylindrical surface of the respective inner magnet in the first set of inner magnets or the second set of inner magnets that is radially aligned with the corresponding outer magnet.

In some implementations, the suspension system further includes a stator assembly. The stator assembly includes a first set of stator windings disposed along one of the inner cylindrical member or the outer cylindrical member. When disposed along the inner cylindrical member, the first set of stator windings are separated from the inner magnets by a radial flux gap. When disposed along the outer cylindrical member, the first set of stator windings are separated from the outer magnets by a radial flux gap. In those implementations, the suspension system includes a first inverter configured to control current supplied from an energy storage device of the vehicle to energize the first set of stator windings to provide an active suspension mode for damping high-frequency vibrations caused by displacements between the inner cylindrical member and the outer cylindrical member in the axial direction as the vehicle travels along a road.

In further implementations, the first set of stator windings include three-phase or single-phase windings. In other further implementations, the stator assembly includes a second set of stator windings disposed along the other one of the inner cylindrical member or the outer cylindrical member. In other even further implementations, the first inverter is further configured to control current supplied from the energy storage device to energize the second set of stator windings independently from the current supplied to energize the first set of stator windings. In additional even further implementations, the suspension system includes a second inverter configured to control current supplied from the energy storage device to energize the second set of stator windings independently from the current supplied to energize the first set of stator windings. The second set of stator windings may include three-phase or single-phase windings.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a perspective view of a vehicle having a hybrid planar active electromagnetic suspension system.

Like reference symbols in the various drawings indicate like elements.

DETAILED DESCRIPTION

Figure 2A:
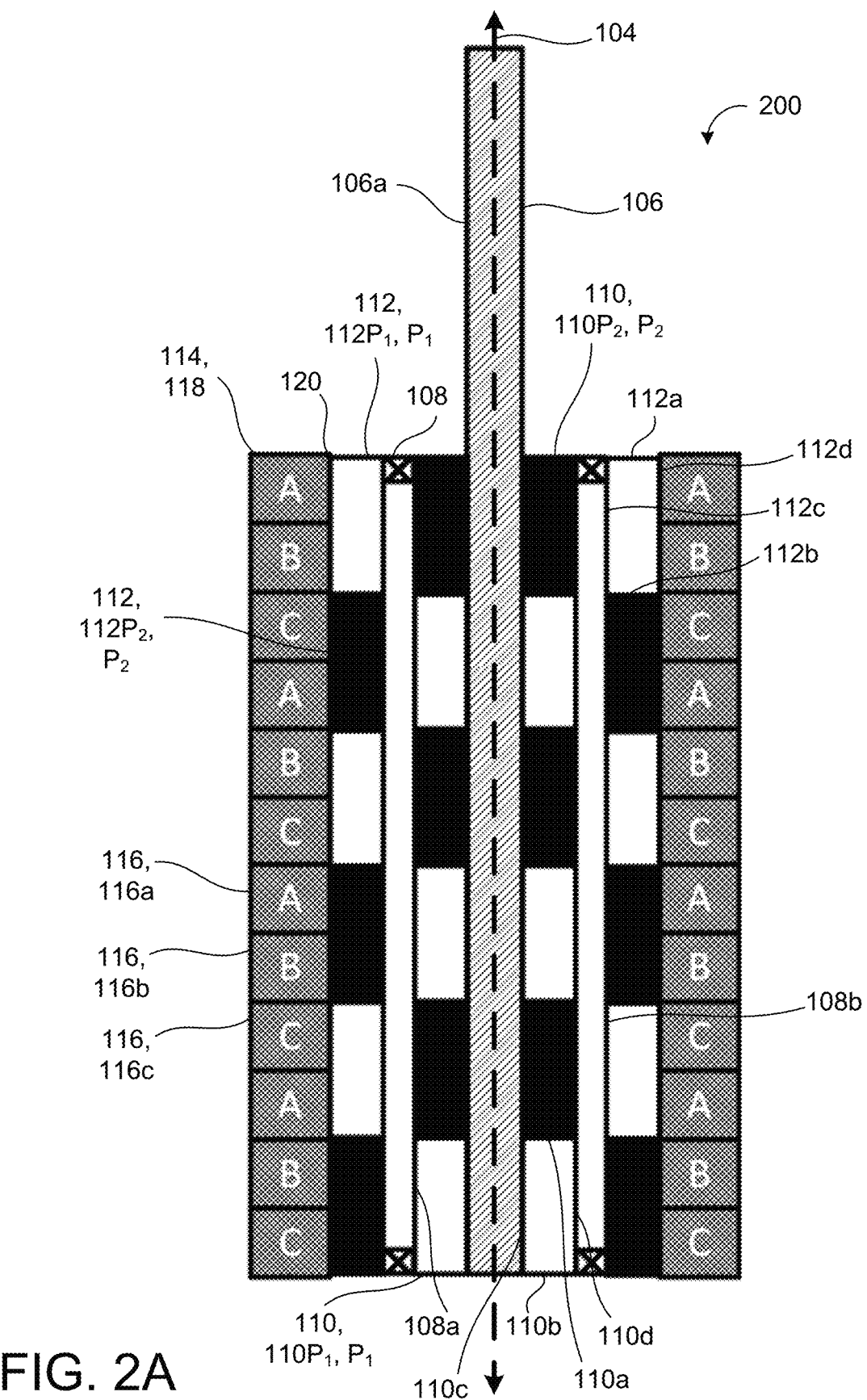
FIG. 2A is a sectional view of a suspension unit of the suspension system of FIG. 1 with a stator assembly having three-phase windings disposed along the outer cylindrical member of the suspension unit.

Referring to FIGS. 1, 2A-2F, and 3, a vehicle 10, such as a battery-powered electric vehicle or a plug-in hybrid vehicle, includes a hybrid planar active electromagnetic suspension system 100. The suspension system 100 includes a plurality of suspension units 200, where each suspension unit 200 is coupled to a respective wheel 12 of the vehicle 10 and is independently controlled to adjust damping of the suspension unit 200 and to adjust height of the vehicle body 14 relative to the respective wheel 12. As described further below, the suspension system 100 can be operated in a passive suspension mode, where each suspension unit 200 provides passive suspension damping at the respective wheel 12, and the suspension system 100 can be operated in an active suspension mode, where each suspension unit 200 is selectively electrically operated or activated to provide active or reactive suspension damping at the respective wheel 12.

The vehicle 10 is equipped with a control module 16 that controls operation of the suspension system 100, and more particularly operation of the individual suspension units 200, in the passive and active suspension modes. A battery or energy storage device (ESD) 18 of the vehicle 10 supplies the electric power for operating the suspension system 100 in the active suspension mode, and an inverter 20 is electrically coupled between the ESD 18 and the suspension unit 200 for controlling the electric current provided to the suspension unit 200. The control module 16 is in communication with the ESD 18 and the inverter 20 for controlling and adjusting the electric current provided to the suspension unit 200 as a level of damping provided by the suspension unit 200 in the active suspension mode is based on the electric current provided to the suspension unit 200. Further, and as discussed below, the control module 16 receives inputs from one or more sensors 22 and a drive mode selector 24 at the vehicle 10 to adjust control of the suspension system 100 based on, for example, current conditions of a road along which the vehicle 10 is travelling or a current drive mode selected by a driver of the vehicle 10.

In some examples, the vehicle 10 is an electrically powered or battery powered vehicle and the ESD 18 electrically powers multiple systems of the vehicle 10, such as a drive system and the suspension system 100 of the vehicle 10. Optionally, the ESD 18 is an auxiliary battery or a dedicated battery for powering only the suspension system 100.

The control module 16 includes data processing hardware 610 (FIG. 6) and memory hardware 620 (FIG. 6) in communication with the data processing hardware 610. The memory hardware 620 stores instructions that, when executed on the data processing hardware 610, cause the data processing hardware 610 to perform operations. For example, the control module 16 stores instructions for operating the suspension system 100 in the passive or active suspension mode based on displacements measured at the suspension unit 200 and/or the drive mode selected by the driver of the vehicle 10.

As shown in FIG. 2A, each suspension unit 200 includes a first structural member or inner cylindrical member 106 and a second structural member or outer cylindrical member 108 that circumscribes the inner cylindrical member 106. The inner cylindrical member 106 defines a longitudinal axis 104 of the suspension unit 200 and the inner cylindrical member 106 and the outer cylindrical member 108 are movable relative to one another along the longitudinal axis 104. One of the inner cylindrical member 106 or the outer cylindrical member 108 is coupled to the sprung mass of the vehicle 10, while the other of the inner cylindrical member 106 or the outer cylindrical member 108 is coupled to the un-sprung mass of the vehicle 10. For example, the inner cylindrical member 106 is coupled to the sprung mass of the vehicle 10 via mounting to the vehicle frame or other structural or body member 14, and the outer cylindrical member 108 is coupled to the un-sprung mass of the vehicle 10 via mounting to the respective wheel 12 of the vehicle 10. In the illustrated example, the outer cylindrical member 108 is fixed relative to the respective wheel 12 of the vehicle 10 and the inner cylindrical member 106 moves within and along the outer cylindrical member 108. Thus, as the vehicle 10 travels along the road and the respective wheel 12 moves relative to the vehicle body 14 due to surface changes in the road, the inner cylindrical member 106 moves relative to the outer cylindrical member 108 along the longitudinal axis 104 to accommodate the movement of the wheel 12.

In further reference to FIG. 2A, a plurality of permanent inner magnets 110 are coupled to the inner cylindrical member 106 along the longitudinal axis 104 of the suspension unit 200. Each permanent inner magnet 110 defines an O-shape or ring-shape extending axially between a first or upper side or end 110a and an opposite second or lower side or end 110b. An inner cylindrical surface 110c and an outer cylindrical surface 110d extend radially between the first side 110a and the second side 110b of each permanent inner magnet 110. Further, a first set $110P_1$ of the permanent inner magnets 110 have a first polarity $P_1$ and a second set $110P_2$ of the permanent inner magnets 110 have a second polarity $P_2$ different than the first polarity $P_1$. The permanent inner magnets 110 are axially stacked on top of one another along the inner cylindrical member 106 so that the first set $110P_1$ and the second set $110P_2$ are alternately arrayed along the inner cylindrical member 106. That is, permanent inner magnets 110 having the first polarity $P_1$ and permanent inner magnets 110 having the second polarity $P_2$ are disposed along the inner cylindrical member 106 in an alternating pattern. Thus, the first or upper sides 110a of permanent inner magnets 110 having the first polarity $P_1$ oppose the second or lower sides 110b of permanent inner magnets 110 having the second polarity $P_2$. Moreover, the inner cylindrical surfaces 110c of each inner permanent magnet 110 radially oppose an outer periphery or outer surface 106a of the inner cylindrical member 106, and the outer cylindrical surfaces 110d of each inner permanent magnet 110 radially oppose an inner cylindrical surface 108a of the outer cylindrical member 108.

A plurality of permanent outer magnets 112 are coupled to the outer cylindrical member 108 along the longitudinal axis 104 of the suspension unit 200. Each permanent outer magnet 112 defines an O-shape or ring-shape having a first or upper side or end 112a and an opposite second or lower side or end 112b. An inner cylindrical surface 112c and an outer cylindrical surface 112d extend between the first side 112a and the second side 112b of each permanent outer magnet 112. Further, a first set $112P_1$ of the permanent outer magnets 112 have the first polarity $P_1$ and a second set $112P_2$ of the permanent outer magnets 112 have the second polarity $P_2$. The permanent outer magnets 112 are axially stacked on top of one another along the outer cylindrical member 108 so that the first set $112P_1$ and the second set $112P_2$ are alternately arrayed along the outer cylindrical member 108. That is, permanent outer magnets 112 having the first polarity $P_1$ and permanent outer magnets 112 having the second polarity $P_2$ are disposed along the outer cylindrical member 108 in an alternating pattern. Thus, similar to the arrangement of permanent inner magnets 110 and as shown in FIG. 2A, the first or upper sides 112a of permanent outer magnets 112 having the first polarity $P_1$ oppose the second or lower sides 112b of permanent outer magnets 112 having the second polarity $P_2$. Moreover, the inner cylindrical surfaces 112c of each outer permanent magnet 112 radially oppose an outer periphery or outer surface 108b of the outer cylindrical member 108.

Further, the inner cylindrical surfaces 112c of the outer permanent magnets 112 radially oppose the outer cylindrical surfaces 110d of the inner permanent magnets 110 so that individual outer permanent magnets 112 are radially aligned with respective individual inner permanent magnets 110, with the outer cylindrical member 108 disposed therebetween. In a default state or position (e.g., FIG. 2A), the inner permanent magnets 110 of the first set $110P_1$ are radially aligned with respective outer permanent magnets 112 of the second set $112P_2$ and inner permanent magnets 110 of the second set $110P_2$ are radially aligned with respective outer permanent magnets 112 of the first set $112P_1$ so that permanent magnets having the first polarity $P_1$ are radially aligned with permanent magnets having the second polarity $P_2$. This creates an attractive magnetic field between the inner permanent magnets 110 and the outer permanent magnets 112 that resists axial movement of the inner cylindrical member 106 relative to the outer cylindrical member 108 along the longitudinal axis 104. Thus, as the vehicle 10 travels along the road and the suspension unit 200 experiences forces from the respective wheel 12 along the longitudinal axis 104, the magnetic field between the permanent magnets 110, 112 provides suspension damping that absorbs displacement between the inner cylindrical member 106 and the outer cylindrical member 108 in the axial direction.

When the vehicle 10 is travelling along the road, displacement and height of the vehicle body 14 relative to the respective wheel 12 may be controlled via control of the displacement and height of the inner cylindrical member 106 relative to the outer cylindrical member 108. When operating in the passive suspension mode, the suspension units 200 provide a fixed amount of suspension damping, via the magnetic field between the inner permanent magnets 110 and the outer permanent magnets 112, to resist movement of the inner cylindrical member 106 and outer cylindrical member 108 relative to one another. The passive suspension is configured to absorb low frequency vibrations or oscillations or displacements of the inner cylindrical member 106 and outer cylindrical member 108 relative to one another as the vehicle 10 travels along the road, such as those caused by changes in the road profile (e.g., a transition from flat road to an incline or decline) or those caused by bumps in the road (e.g., speed bumps or height variations between adjacent sections of road). When the vehicle 10 experiences high frequency vibrations or oscillations or displacements of the inner cylindrical member 106 and outer cylindrical member 108 relative to one another, such as those caused by uneven road surfaces (e.g., a gravel or cobblestone road surface), the control module 16 controls the suspension units 200 in an active suspension mode to adjust the amount of suspension damping provided and reduce the effect of the high frequency vibrations felt by the vehicle body 14.

Each suspension unit 200 includes a stator assembly 114 that is electrically operated to adjust the strength of the magnetic field at the suspension unit 200 and thus adjust the attraction (and therefore resistance to displacement) between the inner permanent magnets 110 and the outer permanent magnets 112. The stator assembly 114 includes windings 116 (such as single-phase windings or three-phase windings) that, responsive to an electrical current, generate an electromagnetic field at the suspension unit 200. With the stator assembly 114 inactive (i.e., no electric current is supplied to the windings 116), the suspension unit 200 is in the passive suspension mode and the magnetic field between the inner permanent magnets 110 and the outer permanent magnets 112 provides passive suspension damping. When the control module 16 operates the suspension unit 200 in active suspension mode, the control module 16 controls electric current provided to energize the stator assembly 114 and the windings 116 generate the electromagnetic field responsive to the provided current. The strength of the electromagnetic field is based on the current provided to the windings 116 and thus the level of active damping provided by the suspension unit 200 is adjusted when the control module 16 adjusts the electric current provided to the stator assembly 114.

Referring to FIGS. 1, 2A, 3, and 4, the inverter 20 is electrically coupled between the ESD 18 and the stator assembly 114 and is operated to control the electric current provided from the ESD 18 to the stator assembly 114 based on signals from the control module 16. The control module 16 and inverter 20 control the electric current to the stator assembly 114 to adjust the strength of the electromagnetic field and therefore adjust the resistance of the active suspension system 100. For example, the control module 16 controls the resistance or stiffness of the suspension unit 200 based on current road conditions (such as based on sensor data captured by the one or more sensors 22 at the vehicle 10), or based on a current drive mode of the vehicle 10 selected via driver input at the drive mode selector 24.

For example, sensors 22 disposed at the vehicle 10 are configured to measure positioning or displacement of the suspension unit 200 relative to a default position or stable point. At the default position or stable point, outer permanent magnets 112 coupled to the outer cylindrical member 108 are aligned with inner permanent magnets 110 coupled to the inner cylindrical member 106 and the passive damping may be suitable to maintain alignment of the outer cylindrical member 108 and the inner cylindrical member 106 at the stable point. As the vehicle 10 travels along the road, forces act on the suspension unit 200 to displace the inner cylindrical member 106 and outer cylindrical member 108 relative to one another and the passive damping of the magnetic field resists this displacement. The one or more sensors 22 (such as a position sensor at one or both of the inner cylindrical member and the outer cylindrical member, an accelerometer at the vehicle, and the like) capture sensor data 26 representative of the relative displacement, rate of displacement, acceleration of displacement of the suspension unit 200 and/or of the vehicle 10 as a whole. The control module 16, based on processing of this captured sensor data 26, generates respective battery control signals 30 and inverter control signals 32 for releasing energy from the ESD 18 and controlling the current from the inverter 20 to the suspension unit 200 to enable active suspension mode. When the active suspension mode is enabled, the windings 116 are energized to generate the electromagnetic field and provide increased resistance to displacement of the suspension unit 200.

In other words, when the control module 16 determines that the suspension unit 200 is experiencing high frequency or substantial displacement, the control module 16 energizes the stator assembly 114 to counteract the displacement forces at the suspension unit 200. The current supplied to the suspension unit 200, and thus the level of active damping provided by the suspension unit 200 is variable based on the determined displacement of the suspension unit 200. For example, the control module 16 energizes the stator assembly 114 in response to frequency or magnitude of displacement of the suspension unit 200 being greater than a threshold displacement frequency or magnitude. Optionally, the vehicle 10 includes respective sensors 22 (e.g., positioning sensors and/or accelerometers) corresponding to each wheel 12 and suspension unit 200 so that each suspension unit 200 may be independently controlled and operated according to the captured sensor data 26 representative of the respective suspension unit 200.

The control module 16 further controls operation of the suspension unit 200 based on the drive mode 28 selected by the driver of the vehicle at the drive mode selector 24. For example, a first drive mode 28 (e.g., a sport drive mode) is configured to provide a stiffer suspension and thus the control module 16 operates the suspension unit 200 to provide higher resistance to displacement or damping, such as by reducing the threshold displacement frequency or magnitude for activating the active suspension mode or by increasing the current provided to the stator assembly 114. Further, a second drive mode 28 (e.g., an off-road drive mode) is configured to provide a less stiff suspension and thus the control module 16 operates the suspension unit 200 to provide lower resistance to displacement or damping, such as by increasing the threshold displacement frequency or magnitude for activating the active suspension mode or by decreasing the current provided to the stator assembly 114.

The stator assembly 114 includes respective windings 116 disposed along the length of the suspension unit 200 and aligned with the permanent magnets so that the control module 16 may control strength of the magnetic field between the inner permanent magnets 110 and the outer permanent magnets 112 at any suitable position along the suspension unit 200. For example, windings 116 at an upper end or region of the suspension unit 200 may be independently energized from windings 116 at an opposite lower end or region of the suspension unit 200 to provide variable damping along the length of the suspension unit 200. The stator assembly 114 may be disposed along the suspension unit 200 in any suitable manner, such as having windings 116 disposed along one or both of the inner cylindrical member 106 and the inner cylindrical member 106.

Figure 4:
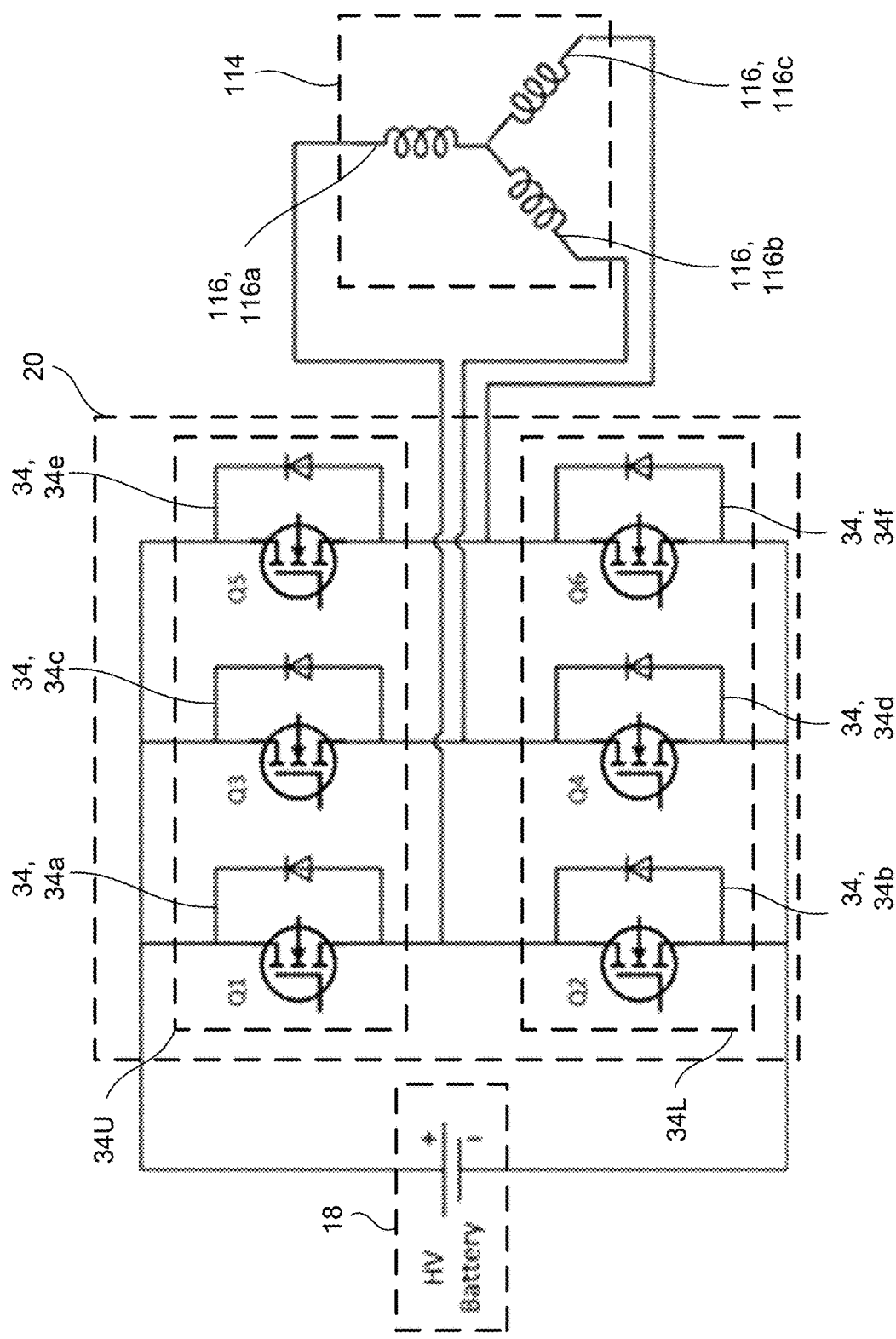
FIG. 4 is a schematic view of a stator assembly having three-phase windings.

For example, and in reference to FIGS. 2A and 4, the stator assembly 114 includes a first set 118 of stator windings 116 disposed along the outer cylindrical member 108 and separated from the outer permanent magnets 112 by a first radial flux gap 120. That is, the windings 116 radially oppose the outer cylindrical surfaces 112d of the outer permanent magnets 112, with the radial flux gap 120 disposed therebetween. In the illustrated example, the first set 118 of stator windings 116 are fixed relative to the outer cylindrical member 108 and the outer permanent magnets 112 and thus move along the longitudinal axis 104 according to movement of the outer cylindrical member 108 relative to the inner cylindrical member 106. However, it should be understood that stator windings 116 may alternatively be fixed relative to the inner cylindrical member 106 or vehicle body 14 with the inner cylindrical member 106 and outer cylindrical member 108 moving along the longitudinal axis 104 relative to the stator windings 116.

As shown, the first set 118 of stator windings 116 include three-phase stator windings 116, 116a-c, including a first phase stator winding 116a, a second phase stator winding 116b, and a third phase stator winding 116c. Thus, the inverter 20 electrically coupled between the ESD 18 and the stator assembly 114 having three-phase stator windings 116 includes a plurality of switches or switching elements 34, 34a-f, and more particularly a first switching element 34a, a second switching element 34b, a third switching element 34c, a fourth switching element 34d, a fifth switching element 34e, and a sixth switching element 34f (FIG. 4). The switching elements 34 are arranged into an upper set of switching elements 34U (the first switching element 34a, the third switching element 34c, and the fifth switching element 34e) and a lower set of switching elements 34L (the second switching element 34b, the fourth switching element 34d, and the sixth switching element 34f). The inverter 20 may include any suitable type of switching elements 34 for selectively amplifying or switching the electric current from the inverter 20. For example, the switching elements 34 may include metal-oxide-semiconductor field-effect transistors (MOSFETs) or insulated-gate bipolar transistors (IGBTs).

The first phase stator winding 116a is electrically coupled between the first switching element 34a and the second switching element 34b. The second phase stator winding 116b is electrically coupled between the third switching element 34c and the fourth switching element 34d. The third phase stator winding 116c is electrically coupled between the fifth switching element 34e and the sixth switching element 34f.

In the illustrated example, the first set 118 of stator windings 116 includes a plurality of three-phase stator windings 116 disposed along the outer permanent magnets 112 so that a plurality of first phase stator windings 116a, a plurality of second phase stator windings 116b, and a plurality of third phase stator windings 116c are alternately arranged along the suspension unit 200. Each of the respective stator windings 116 (collectively, the first phase stator windings, the second phase stator windings, and the third phase stator windings) may be controlled in parallel to one another to achieve a uniform electromagnetic field along the suspension unit 200. Optionally, the individual windings 116 (and the individual first phase stator windings, the second phase stator windings, and the third phase stator windings) disposed along the suspension unit 200 are controlled separately and independently from one another to achieve any desired electromagnetic field along the suspension unit 200.

Figure 2B:
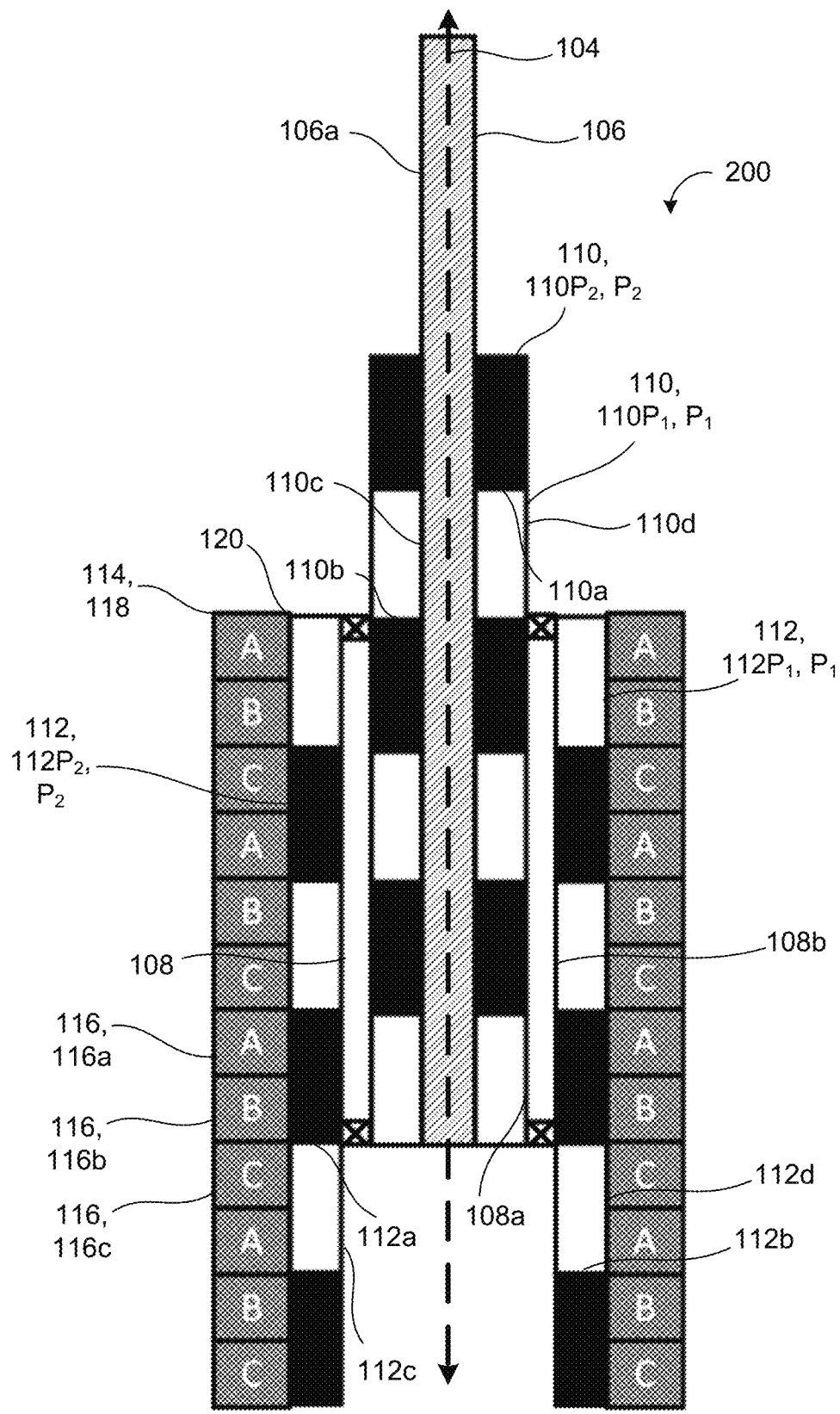
FIG. 2B is a sectional view of the suspension unit of FIG. 2A, with the stable point of the suspension unit shifted relative to FIG. 2A for an off-road drive mode.
Figure 2C:
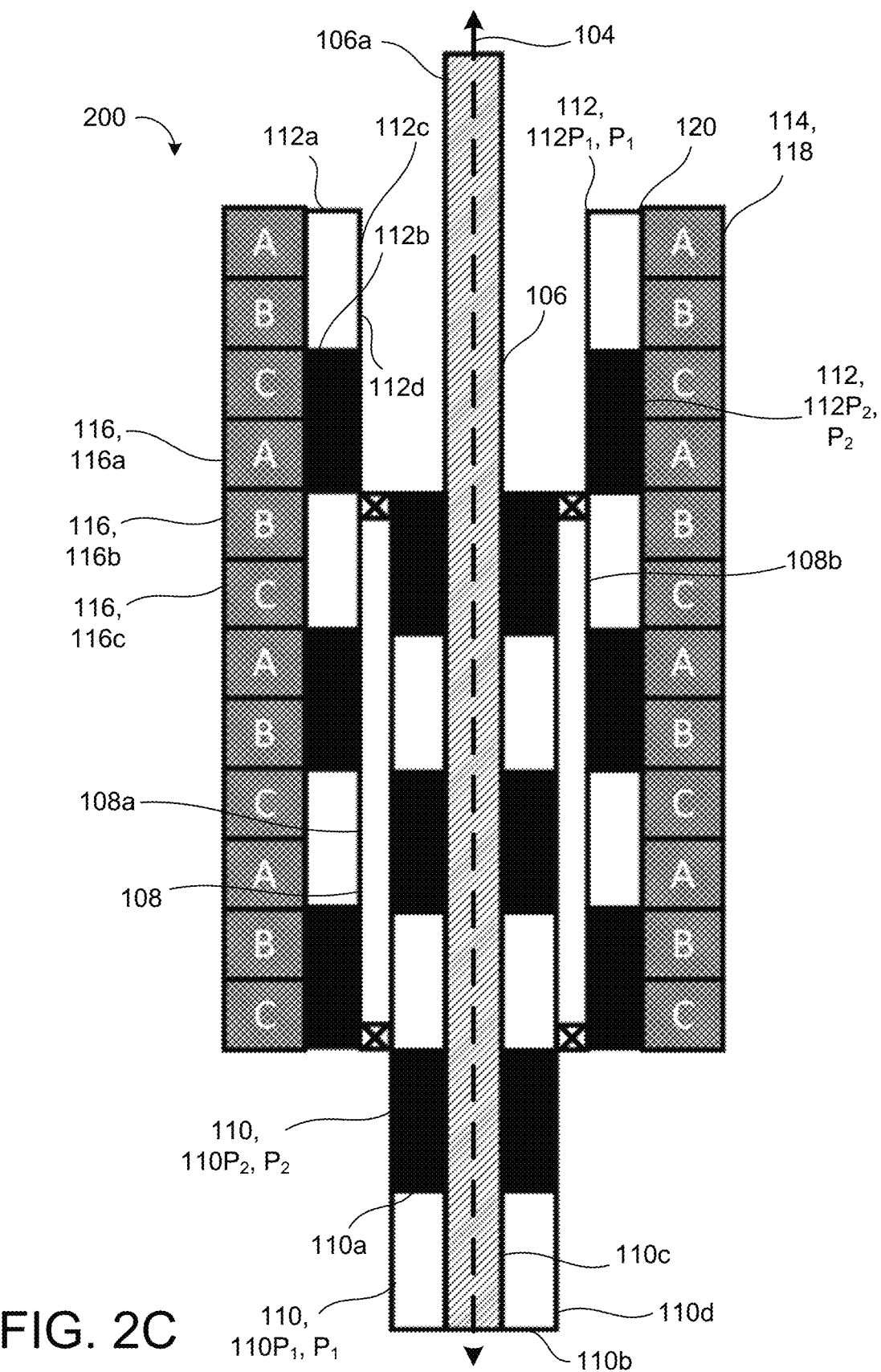
FIG. 2C is a sectional view of the suspension unit of FIG. 2A, with the stable point of the suspension unit shifted relative to FIG. 2A for a highway or sport drive mode.

Referring to FIGS. 2A-2C, the control module 16 is operable to shift the stable point of the suspension unit 200 along the longitudinal axis 104 based on the current drive mode 28 selected for the suspension system 100. That is, based on the selected drive mode 28, the alignment of the inner cylindrical member 106 and outer cylindrical member 108 relative to one another at the stable point is adjusted so that the height of the vehicle body 14 relative to the wheel 12 is adjusted. When the suspension unit 200 is at a given stable point, inner permanent magnets $110P_1$ having the first polarity $P_1$ are radially aligned with respective outer permanent magnets $112P_2$ having the second polarity $P_2$ and inner permanent magnets $110P_2$ having the second polarity $P_2$ are aligned with respective outer permanent magnets $112P_1$ having the first polarity $P_1$ (e.g., FIG. 2A). When the stable point of the suspension unit 200 is shifted, the alignment of the inner permanent magnets 110 and the outer permanent magnets 112 is shifted so that different inner permanent magnets 110 align with different respective outer permanent magnets 112 having the opposite polarity (e.g., FIGS. 2B and 2C).

Shifting of the stable point is accomplished by generating a magnetic field via the stator windings 116 in a desired shifting direction that is strong enough to overcome the passive magnetic field between the inner permanent magnets 110 and outer permanent magnets 112. For example, providing a larger electric current to the stator windings 116 at an upper end or region of the suspension unit 200 than at a lower end or region of the suspension unit 200 may generate a stronger attracting magnetic field toward the upper end of the suspension unit 200 and pull the outer cylindrical member 108 upward along the longitudinal axis 104 relative to the inner cylindrical member 106 and cause the outer permanent magnets 112 to align with different respective inner permanent magnets 110 at higher positions along the inner cylindrical member 106. Similarly, providing a larger electric current to the stator windings 116 at the lower end or region of the suspension unit 200 than at the upper end or region of the suspension unit 200 may generate a stronger attracting magnetic field toward the lower end of the suspension unit 200 and pull the outer cylindrical member 108 downward along the longitudinal axis 104 relative to the inner cylindrical member 106 and cause the outer permanent magnets 112 to align with different respective inner permanent magnets 110 at lower positions along the inner cylindrical member 106.

The control module 16 controls the electric current provided to the stator assembly 114 through the inverter 20 to shift the stable point of the suspension unit 200 based on the drive mode 28 selected by the driver of the vehicle 10. Optionally, the control module 16 monitors the position of the inner cylindrical member 106 and outer cylindrical member 108 relative to one another and relative to the current stable point and, if the stable point inadvertently shifts (such as due to a large displacement of the suspension unit while the vehicle travels along the road), the control module 16 controls the electric current provided to the stator assembly 114 to shift the inner cylindrical member 106 and outer cylindrical member 108 back to the desired stable point. That is, if the alignment of the inner permanent magnets 110 and the outer permanent magnets 112 shifts from the alignment at the stable point, the control module 16 electrically energizes the stator assembly 114 to adjust the suspension unit 200 back to the stable point.

The suspension unit 200 is shown at a default stable point in FIG. 2A and the suspension unit 200 is shown at a raised stable point in FIG. 2B. That is, with the wheel 12 coupled to the outer cylindrical member 108 and the vehicle body 14 coupled to the inner cylindrical member 106, electric current is provided to the stator assembly 114 to shift the outer cylindrical member 108 downward along the longitudinal axis 104 and the inner cylindrical member 106 to raise the vehicle body 14 relative to the wheel 12. Alternatively, the suspension unit 200 may be operated to shift the inner cylindrical member 106 upward along the outer cylindrical member 108 to raise the vehicle body 14. Once shifted to the raised stable point of FIG. 2B, the passive magnetic field between the inner permanent magnets 110 and the outer permanent magnets 112 maintains the relative position of the inner cylindrical member 106 to the outer cylindrical member 108, and the control module 16 may deactivate the active suspension mode until displacement of the suspension unit 200 from the new stable point requires activation of the active suspension mode, such as described above. For example, the control module 16 energizes the stator assembly 114 to achieve the raised stable point of FIG. 2B in response to selection of an off-road drive mode 28. Optionally, while operating in the off-road drive mode 28, the control module 16 may provide a less stiff suspension and thus allows for greater displacement of the suspension unit 200 from the stable point when employing the active suspension mode.

The suspension unit 200 is shown at a lowered stable point in FIG. 2C. That is, with the wheel 12 coupled to the outer cylindrical member 108 and the vehicle body 14 coupled to the inner cylindrical member 106, electric current is provided to the stator assembly 114 to shift the outer cylindrical member 108 upward along the longitudinal axis 104 and the inner cylindrical member 106 to lower the vehicle body 14 relative to the wheel 12 as compared to the default position of FIG. 2A. Alternatively, the suspension unit 200 may be operated to shift the inner cylindrical member 106 downward along the outer cylindrical member 108 to lower the vehicle body 14. Once shifted to the lowered stable point of FIG. 2C, the passive magnetic field between the inner permanent magnets 110 and the outer permanent magnets 112 maintains the relative position of the inner cylindrical member 106 to the outer cylindrical member 108, and the control module 16 may deactivate the active suspension mode until displacement of the suspension unit 200 from the new stable point requires activation of the active suspension mode. For example, the control module 16 energizes the stator assembly 114 to achieve the lowered stable point of FIG. 2C in response to selection of a highway or sport drive mode 28. Optionally, while operating in the highway or sport drive mode 28, the control module 16 may provide a stiffer suspension and thus allows for less displacement of the suspension unit 200 from the stable point when employing the active suspension mode.

Optionally, the first set 118 of stator windings 116 includes single-phase stator windings 116d and thus, the inverter 20 electrically coupled between the ESD 18 and the stator assembly 114 includes a single-phase inverter 20. For example, and in reference to FIGS. 5 and 10, the stator assembly 114 includes a first set 118 of stator windings 116 disposed along the outer cylindrical member 108 and separated from the outer permanent magnets 112 by the first radial flux gap 120. That is, the windings 116 radially oppose the outer cylindrical surfaces 112d of the outer permanent magnets 112, with the radial flux gap 120 disposed therebetween.

Figure 2D:
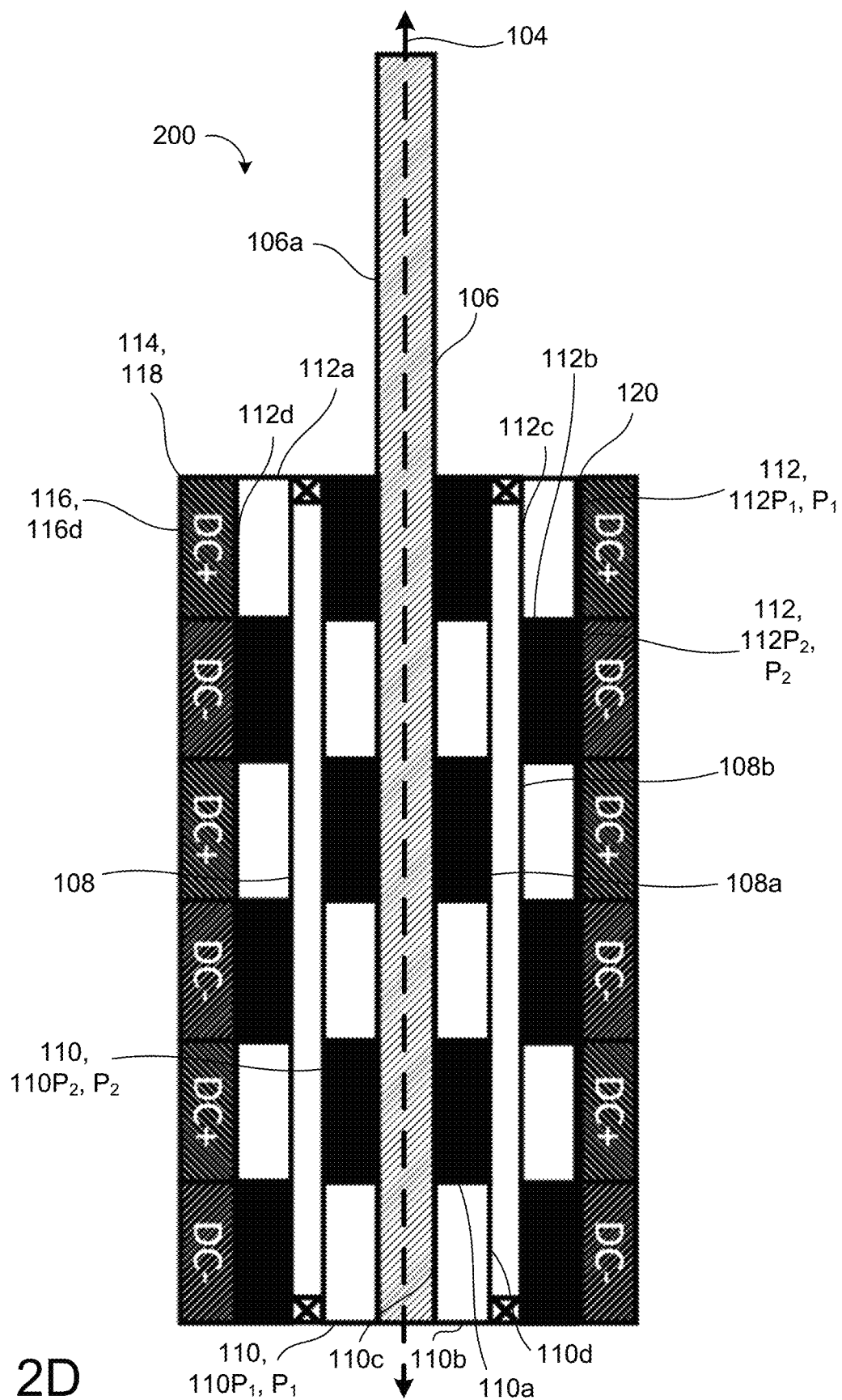
FIG. 2D is a sectional view of a suspension unit with a stator assembly having single-phase windings.
Figure 2E:
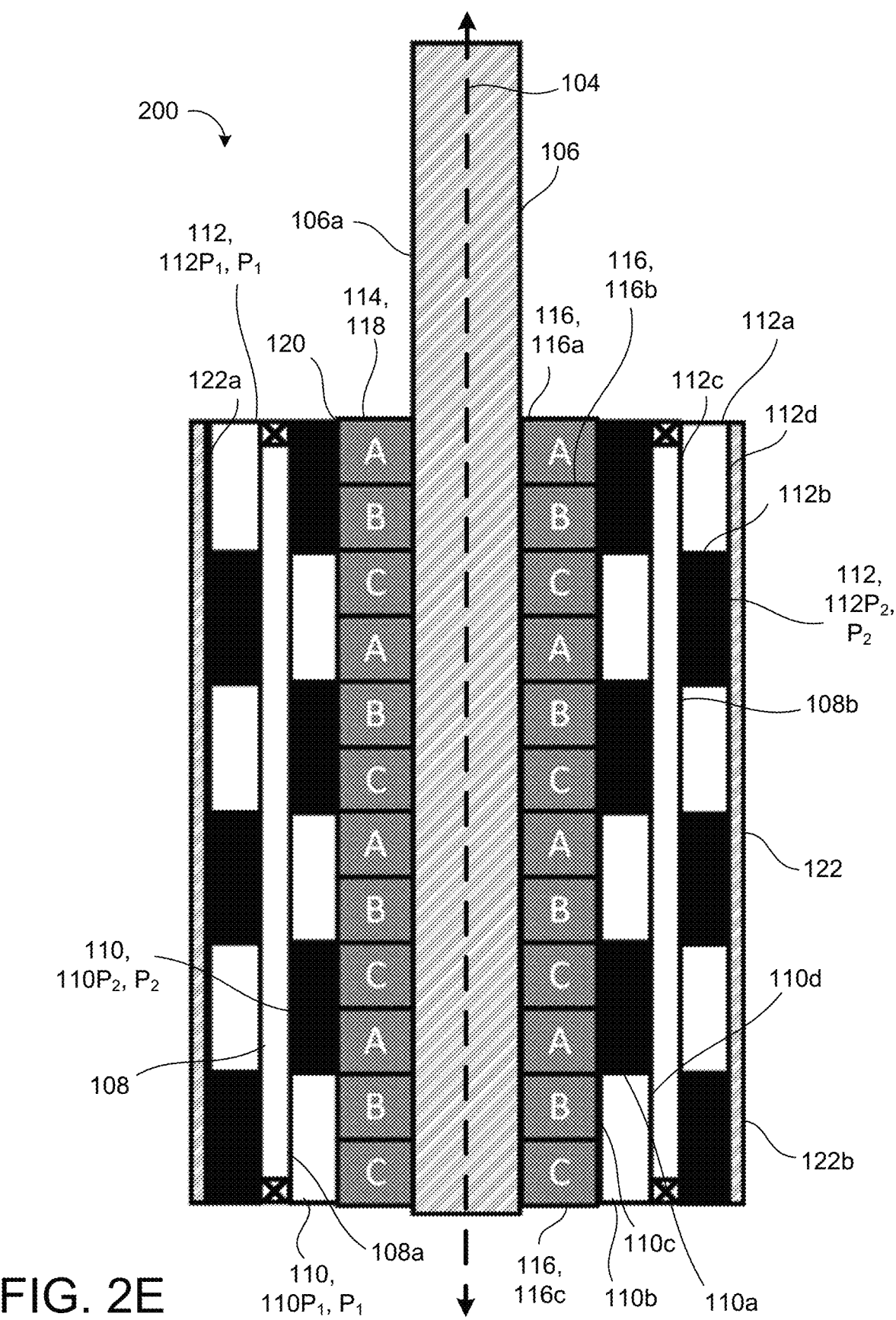
FIG. 2E is a sectional view of a suspension unit with a stator assembly having three-phase windings disposed along the inner cylindrical member.
Figure 5:
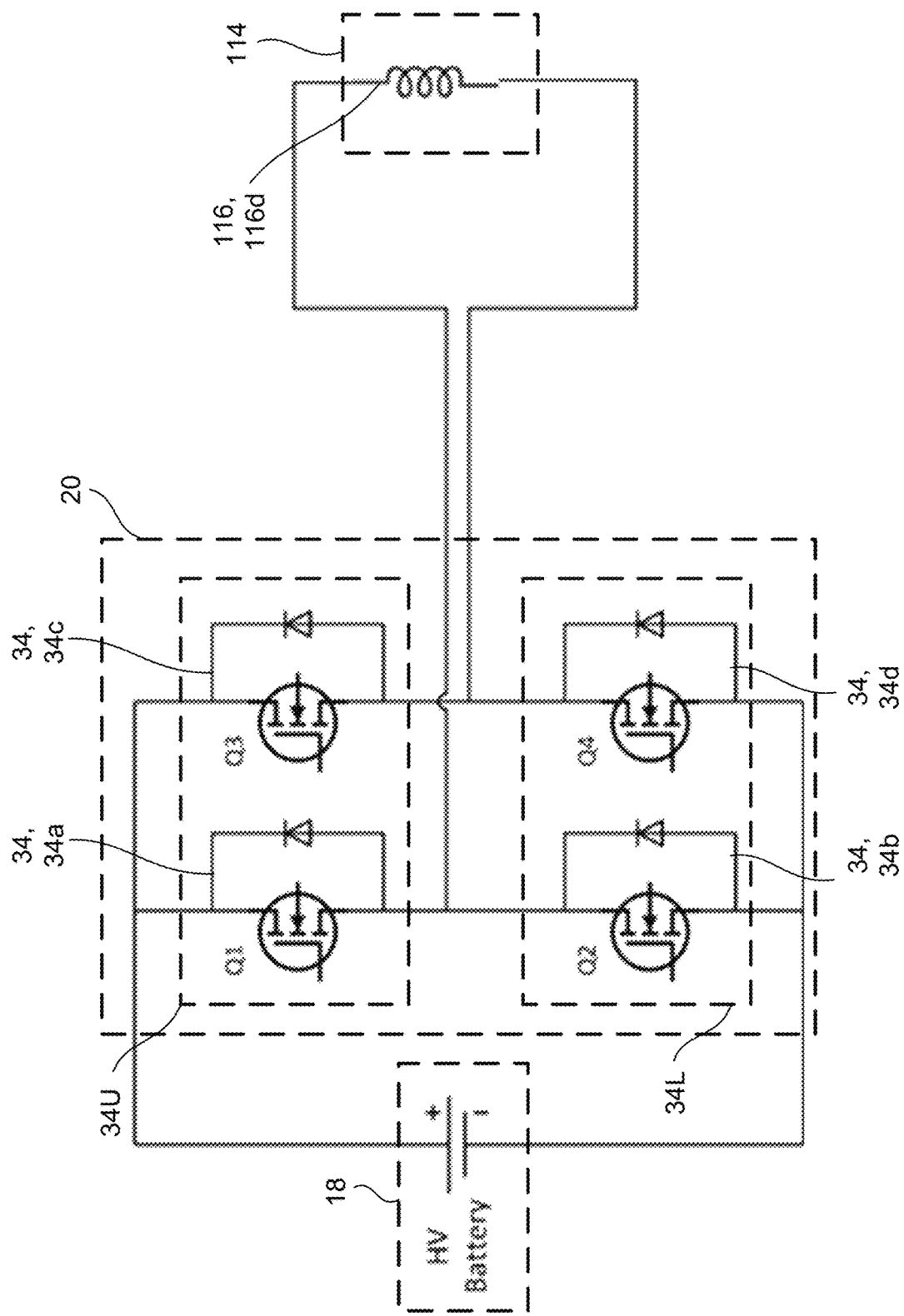
FIG. 5 is a schematic view of a stator assembly having single-phase windings.

In the illustrated example of FIG. 2D, single-phase stator windings 116d having opposite polarities are alternately arrayed along the outer cylindrical member 108 to generate changes in the magnetic field along the suspension unit 200, such as to effectuate shifts in the stable point of the suspension unit 200 when differences in the magnetic field are generated along the longitudinal axis 104. Thus, the inverter 20 electrically coupled between the ESD 18 and the stator assembly 114 having single-phase stator windings 116d is a single-phase inverter 20. The single-phase inverter 20 includes switching elements 34, 34a-d, and more particularly the first switching element 34a, the second switching element 34b, the third switching element 34c, and the fourth switching element 34d (FIG. 5). The switching elements 34 are arranged into the upper set of switching elements 34U (the first switching element 34a and the third switching element 34c) and the lower set of switching elements 34L (the second switching element 34b and the fourth switching element 34d). The single-phase stator winding 116d has a first end electrically coupled between the first switching element 34a and the second switching element 34b, and a second end electrically coupled between the third switching element 34c and the fourth switching element 34d.

Optionally, the first set 118 of stator windings 116 are disposed along the inner cylindrical member 106 and separated from the inner permanent magnets 110 by the first radial flux gap 120. For example, and in reference to FIGS. 2E and 4, the stator assembly 114 includes the first set 118 of stator windings 116 disposed along the inner cylindrical member 106 and separated from the inner permanent magnets 110 by the first radial flux gap 120. That is, the windings 116 radially oppose the inner cylindrical surfaces 110c of the inner permanent magnets 110, with the radial flux gap 120 disposed therebetween. In the illustrated example, the first set 118 of stator windings 116 are fixed relative to the inner cylindrical member 106 and the inner permanent magnets 110 and thus the outer cylindrical member 108 and the outer permanent magnets 112 move along the longitudinal axis 104 relative to the first set 118 of stator windings 116. Optionally, the first set 118 of stator windings 116 disposed along the inner cylindrical member 106 move along the inner cylindrical member 106 according to movement of the outer cylindrical member 108.

Furthermore, with the stator windings 116 disposed along the inner cylindrical member 106, the outer permanent magnets 112 are coupled to a structural component 122 (e.g., a portion of the wheel 12) to fix the outer permanent magnets 112 relative to the wheel 12 and the outer cylindrical member 108. Thus, the outer cylindrical surfaces 112d of the outer permanent magnets 112 are coupled to an inner surface 122a of the structural component 122 and the inner cylindrical surfaces 112c are coupled to the outer surface 108b of the outer cylindrical member 108. An outer surface 122b of the structural component 122 may be coupled to the vehicle wheel 12.

As shown, the first set 118 of stator windings 116 disposed along the inner cylindrical member 106 include the first phase stator winding 116a, the second phase stator winding 116b, and the third phase stator winding 116c and the three-phase windings 116 are electrically coupled to the three-phase inverter 20 of FIG. 4.

The first set 118 of stator windings 116 includes a plurality of three-phase stator windings 116 disposed along the inner permanent magnets 110 so that a plurality of first phase stator windings 116a, a plurality of second phase stator windings 116b, and a plurality of third phase stator windings 116c are alternately arranged along the suspension unit 200. Each of the respective stator windings 116 (collectively, the first phase stator windings, the second phase stator windings, and the third phase stator windings) may be controlled in parallel to one another to achieve a uniform electromagnetic field along the suspension unit 200. Optionally, the individual windings 116 (and the individual first phase stator windings, the second phase stator windings, and the third phase stator windings) disposed along the suspension unit 200 are controlled separately and independently from one another to achieve any desired electromagnetic field along the suspension unit 200.

In some examples, the stator assembly 114 includes the first set 118 of stator windings 116 disposed along one of the inner cylindrical member 106 and the outer cylindrical member 108 and a second set 124 of stator windings 116 disposed along the other of the inner cylindrical member 106 and the outer cylindrical member 108. The second set 124 of stator windings 116 are separated from the permanent magnets coupled to the respective cylindrical member by a second radial flux gap 126. The second set 124 of stator windings 116 may include single-phase stator windings 116d or three-phase stator windings 116a-c, and the second set 124 of stator windings 116 may be connected to an independent inverter 20 from the first set 118 of stator windings 116 to enable independent control of the second set 124 of windings 116 from the first set 118. Having independently controlled windings 116 along the inner permanent magnets 110 and the outer permanent magnets 112 (and optionally, with different controller bandwidth), creates multi-planar damping capabilities, allowing the system 100 to notch special or critical or significant vibrations. In other words, the independent inverters 20 may be configured to provide different currents to the first set 118 and second set 124 of stator windings 116 to provide variable damping of the suspension unit 200.

Figure 2F:
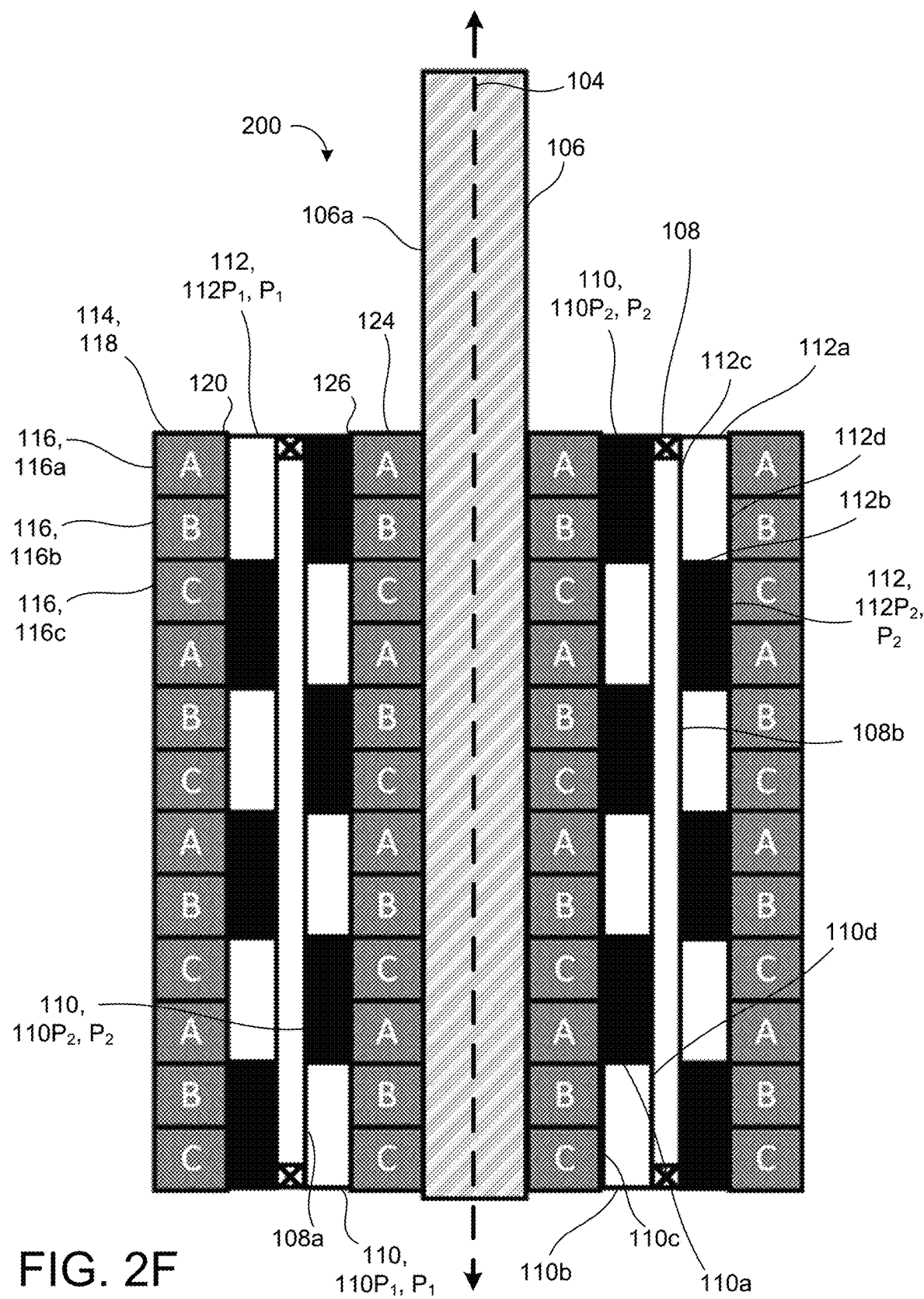
FIG. 2F is a sectional view of a suspension unit with a stator assembly having a first set of three-phase windings disposed along the inner cylindrical member and a second set of three-phase windings disposed along the outer cylindrical member.
Figure 3:
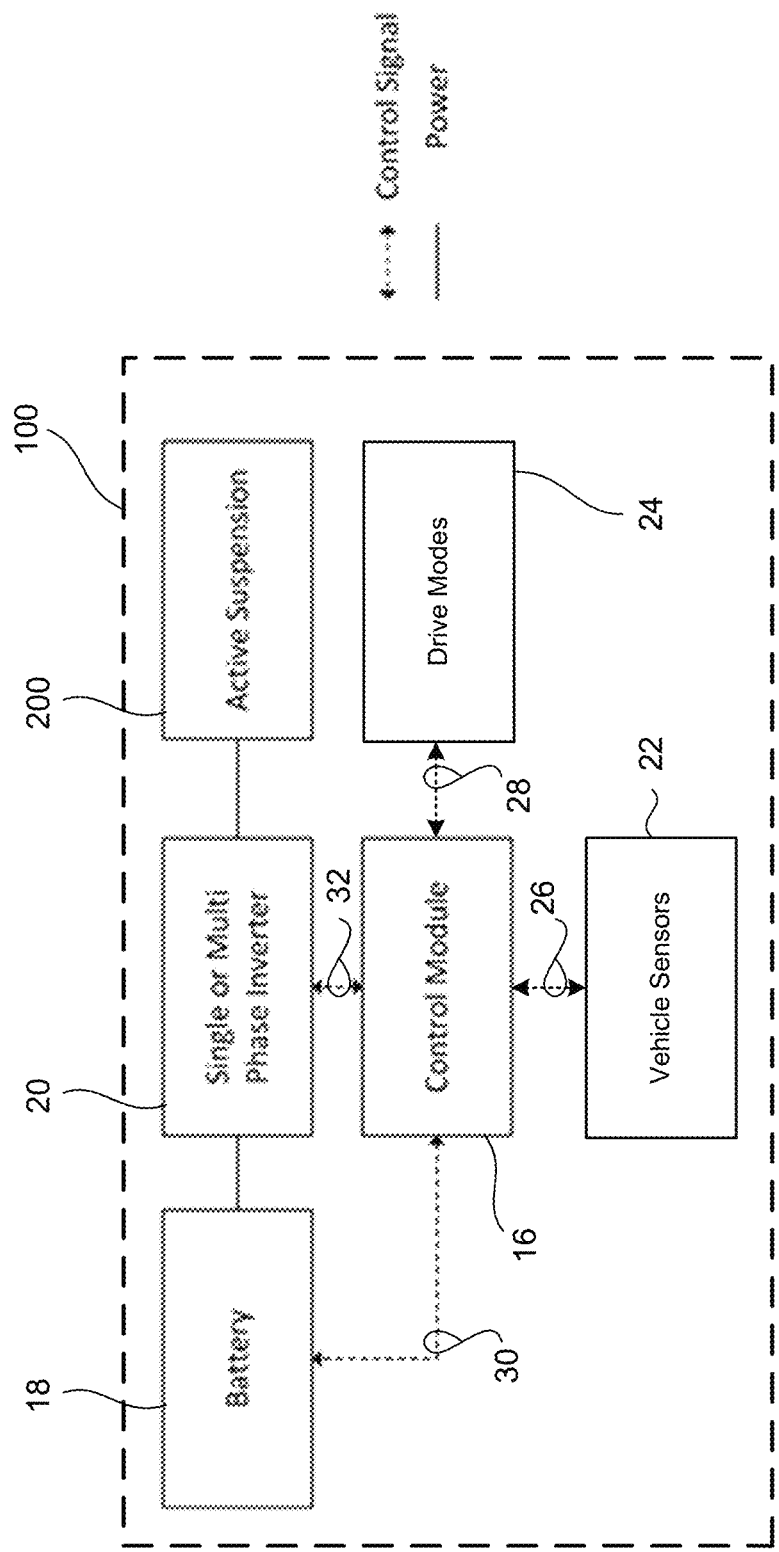
FIG. 3 is a schematic view of the suspension system of FIG. 1.

In reference to FIGS. 2F and 4, the stator assembly 114 includes the first set 118 of stator windings 116 disposed along the outer cylindrical member 108 and separated from the outer permanent magnets 112 by the first radial flux gap 120. That is, the windings 116 of the first set 118 radially oppose the outer cylindrical surfaces 112d of the outer permanent magnets 112, with the radial flux gap 120 disposed therebetween. The stator assembly 114 further includes the second set 124 of stator windings 116 disposed along the inner cylindrical member 106 and separated from the inner permanent magnets 110 by the second radial flux gap 126. The first set 118 of stator windings 116 are fixed relative to the outer cylindrical member 108 and the outer permanent magnets 112, and the second set 124 of stator windings 116 are fixed relative to the inner cylindrical member 106 and the inner permanent magnets 110. Thus, the first set 118 and the second set 124 of stator windings 116 move along the longitudinal axis 104 relative to one another according to movement of the outer cylindrical member 108 and the inner cylindrical member 106 relative to one another.

As shown, the first set 118 and the second set 124 of stator windings 116 include first phase stator windings 116a, second phase stator windings 116b, and third phase stator windings 116c and the three-phase windings 116 are electrically coupled to the three-phase inverter 20 of FIG. 4. The first set 118 of stator windings 116 includes a plurality of three-phase stator windings 116 disposed along the outer permanent magnets 112 and the second set 124 of stator windings 116 includes a plurality of three-phase stator windings 116 disposed along the inner permanent magnets 110 so that a plurality of first phase stator windings 116a, a plurality of second phase stator windings 116b, and a plurality of third phase stator windings 116c are alternately arranged along the suspension unit 200.

Each of the respective stator windings 116 (collectively, the first phase stator windings, the second phase stator windings, and the third phase stator windings) may be controlled in parallel to one another to achieve a uniform electromagnetic field along the suspension unit 200. Optionally, the individual windings 116 (and the individual first phase stator windings, the second phase stator windings, and the third phase stator windings) disposed along the suspension unit 200 are controlled separately and independently from one another to achieve any desired electromagnetic field along the suspension unit 200. The inverter 20 may supply electric current to both the first set 118 and the second set 124 of stator windings 116 together and in tandem. Optionally, a second inverter is electrically coupled between the ESD 18 and the stator assembly 114 and configured to control current supplied from the ESD 18 to energize the second set 124 of stator windings 116 independently from the current supplied to energize the first set 118 of stator windings 116.

Optionally, the suspension unit 200 generates power back to the ESD 18 in response to displacement of the inner cylindrical member 106 and the outer cylindrical member 108 relative to one another. In other words, when the inner permanent magnets 110 and the outer permanent magnets 112 move along the longitudinal axis 104 relative to one another, the movement may create an electromagnetic induction reaction in the windings 116 to generate current at the stator assembly 114. The inverter 20 may then convert the generated current for storage at the ESD 18 to restore charge of the ESD 18.

Therefore, the vehicle 10 is equipped with the suspension system 100 including suspension units 200 that are independently or collectively controlled by the control module 16 in passive suspension mode and active suspension mode. When operating in passive mode, an attractive magnetic field between the inner permanent magnets 110 coupled to the inner cylindrical member 106 and the outer permanent magnets 112 coupled to the outer cylindrical member 108 passively resists displacement between the inner cylindrical member 106 and the outer cylindrical member 108. When operating in active mode, the control module 16 controls electric current provided to the stator assembly 114 from the inverter 20 to energize windings 116 of the stator assembly 114 and adjust strength of the magnetic field to adjust damping of the suspension unit 200 or resistance to displacement of the inner cylindrical member 106 and the outer cylindrical member 108 relative to one another. The control module 16 adjusts the magnetic field based on a current drive mode 28 of the vehicle 10 and/or sensor data 26 captured by one or more vehicle sensors 22 (e.g., position sensors and accelerometers disposed at the individual suspension units and/or an accelerometer/gyroscope disposed on the vehicle 10 at a location isolated from specific individual suspension units).

For instance, the one or more vehicle sensors 22 may include a respective position/displacement sensor disposed at each individual suspension unit 200 for measuring the displacement properties of the individual suspension unit 200 such as relative displacement between the inner cylindrical member 106 and the outer cylindrical member 108. Based on consecutive relative displacement measurements received from the respective position/displacement sensor, the control module 18 may calculate a rate of displacement or displacement frequency of the individual suspension unit 200 for use operating the individual suspension unit 200 in the active suspension mode. Similarly, the displacement measurements received from the respective position/displacement sensors may be used to adjust the dampening properties of the passive suspension mode in a reactive manner by controlling the strength of the magnetic field on the fly. In this way, the passive and/or active suspension mode of each individual suspension unit 200 may be controlled independently from the other individual suspension units 200 based on the displacement measurements measured by the respective position/displacement sensors.

In some implementations, the one or more vehicle sensors 22 include a respective accelerometer and/or gyroscope disposed proximate to each individual suspension unit 200. That is, a respective accelerometer and/or gyroscope may be disposed at a respective one of four quadrants of the vehicle 10 that each correspond to a respective wheel location of the vehicle. Each accelerometer is configured to measure an acceleration/frequency of the sprung mass (e.g., body/frame) relative to the un-sprung mass (e.g., respective wheel) at the corresponding quadrant of the vehicle 10 as the vehicle 10 traverses along a path (e.g., road or off-road path). A respective gyroscope disposed proximate to each individual suspension unit 200 may be configured to measure rotational changes and orientation at the corresponding quadrant of the vehicle 10. The one or more vehicle sensors 22 may include any combination respective displacement/position sensors and accelerometer/gyroscopes disposed proximate to each individual suspension unit.

Additionally, the one or more vehicle sensors 22 may include a centralized accelerometer configured to measure a global accelerator ion/frequency of the sprung mass (e.g., vehicle) relative to multiple un-sprung masses (e.g., all the wheels). Similarly, a centralized gyroscope may correspond to a vehicle sensor for measuring a global rotational change/orientation of the vehicle that is not isolated toward any specific individual suspension unit 200.

Implementations herein are inclusive of any combination of vehicle sensors 22 for measuring displacement/acceleration/orientation of individual suspension units 200 and/or measuring global displacement/acceleration/orientation of the vehicle 10 as a whole for use by the control module 200 in controlling the each of the individual suspension units 200. In addition to position/displacement sensors and accelerometers/gyroscopes, the one or more sensors 22 may additionally include any combination of a global positioning system (GPS) sensor for ascertaining current and/or upcoming roadway conditions based on a current position of the vehicle, a velocity sensor measuring the speed at which the vehicle is traveling, a torque input sensor measuring an accelerator pedal input from the driver to predict upcoming changes for controlling the suspensions 200, or an ambient temperature sensor for use in controlling the strength of the magnetic flux based on temperature (e.g., higher temperatures reduce strength of magnetic fields).

In scenarios where a wheel of the vehicle 10 runs into a large pothole or over a large object (e.g., parking curb) that causes sufficient force to displace the arrangement of the inner and outer magnets 110, 112 such that the inner and outer cylindrical members 106, 108 of the corresponding individual suspension unit 200 is stuck in a misaligned state, the control module 16 effectively ascertains the misaligned state based on displacement properties measured by the one or more sensors 22 and responsively control electric current provided to the stator assembly 114 from the inverter 20 to energize windings 116 of the stator assembly 114 of the corresponding suspension unit 200 to move the inner and outer cylindrical members 106, 108 back into proper alignment. Notably, in the presence of an electrical fault where the control module 16 is unable to provide current to the individual suspension unit 200 for operating in the active suspension mode, each individual suspension unit 200 is still able to operate in the passive suspension mode based on the arrangement and polarities of the inner and outer magnets 110, 112.

In other words, the active and passive suspensions will behave as a planar suspension. Based on the size of the permanent magnets and their resultant airgap flux in conjunction with the bandwidth of current and/or voltage control when operating in active suspension mode, the suspension units 200 at the vehicle 10 will react as a planar electromagnetic suspension.

Figure 6:
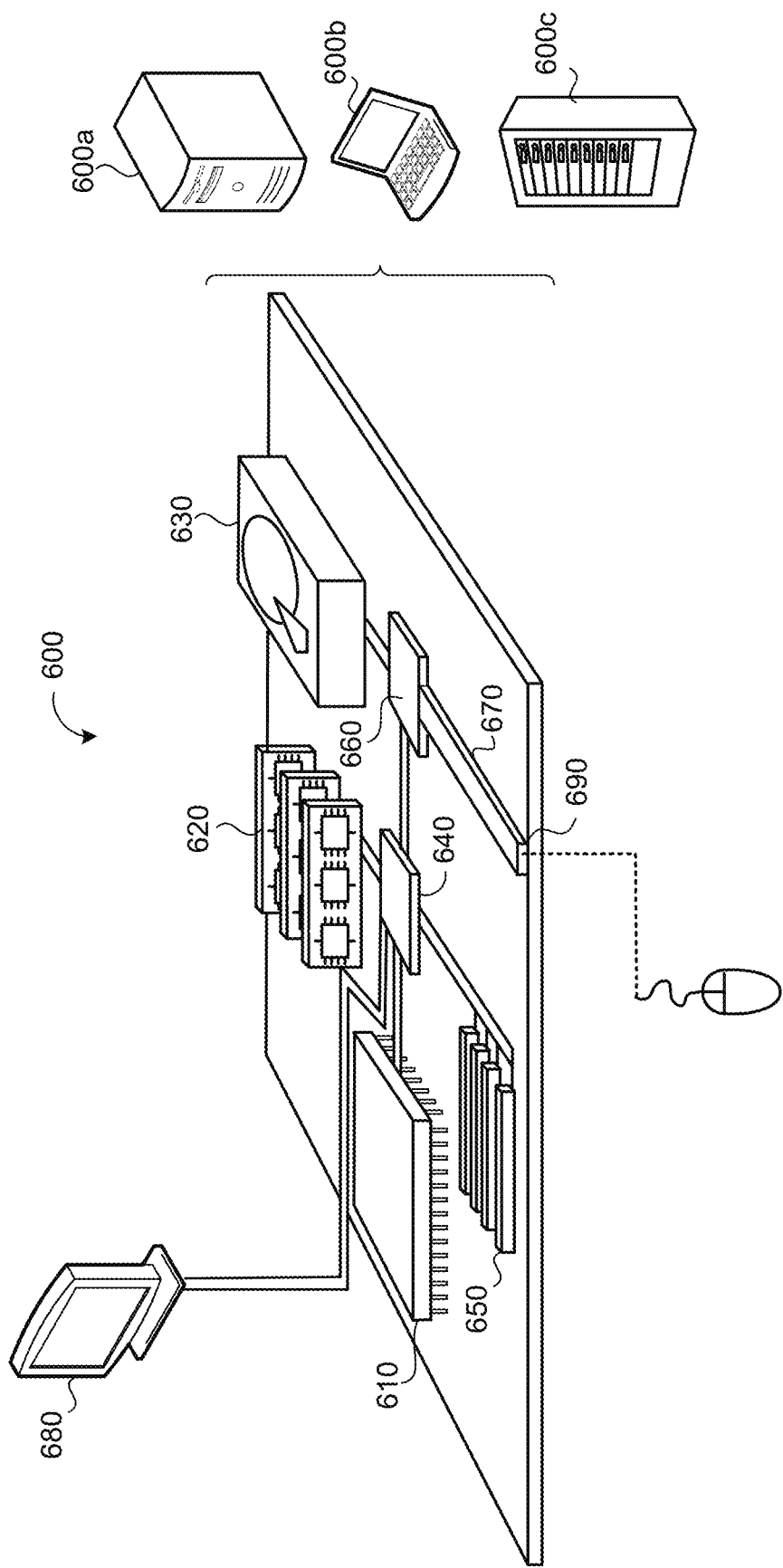
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims.

What is claimed is:

1. A hybrid planar active electromagnetic suspension, the suspension comprising:
   a plurality of inner magnets coupled to an inner cylindrical member that defines a longitudinal axis, the plurality of inner magnets axially stacked on top of one another in an axial direction parallel to the longitudinal axis and comprising:
      a first set of inner magnets each having a first polarity; and
      a second set of inner magnets each having a second polarity different than the first polarity, the second set of inner magnets and the first set of inner magnets alternately arrayed in the axial direction;
   a plurality of outer magnets coupled to an outer cylindrical member that circumscribes the inner cylindrical member, the plurality of outer magnets axially stacked on top of one another in the axial direction and comprising:
      a first set of outer magnets each having the first polarity; and
      a second set of outer magnets each having the second polarity, the second set of outer magnets and the first set of outer magnets alternately arrayed in the axial direction;
   a stator assembly comprising a first set of stator windings disposed along one of:
      the inner cylindrical member, the first set of stator windings when disposed along the inner cylindrical member separated from the inner magnets by a radial flux gap; or
      the outer cylindrical member, the first set of stator windings when disposed along the outer cylindrical member separated from the outer magnets by a radial flux gap; and
   a first inverter configured to control current supplied from an energy storage device to energize the first set of stator windings to provide an active suspension mode for damping high-frequency vibrations caused by displacements between the inner cylindrical member and the outer cylindrical member in the axial direction,
   wherein each inner magnet in the first set of inner magnets is radially aligned with a respective outer magnet in the second set of outer magnets and each inner magnet in the second set of inner magnets is radially aligned with a respective outer magnet in the first set of outer magnets to provide an attractive electromagnetic field between the inner and outer magnets that resists movement of the inner cylindrical member relative to the outer cylindrical member in the axial direction.

2. The suspension of claim 1, wherein the inner cylindrical member is coupled to one of a sprung mass or an un-sprung mass and the outer cylindrical member is coupled to the other one of the sprung mass or the un-sprung mass.

3. The suspension of claim 2, wherein the sprung mass comprises a vehicle body member and the un-sprung mass comprises a vehicle wheel.

4. The suspension of claim 1, wherein:
   each corresponding inner magnet defines a ring-shape having an inner cylindrical surface radially opposing an outer periphery of the inner cylindrical member, and an outer cylindrical surface; and
   each corresponding outer magnet defines a ring-shape having an inner cylindrical surface radially opposing the outer cylindrical member, and an outer cylindrical surface, the inner cylindrical surface of the corresponding outer magnet radially opposing the outer cylindrical surface of the respective inner magnet in the first set of inner magnets or the second set of inner magnets that is radially aligned with the corresponding outer magnet.

5. The suspension of claim 1, wherein the first set of stator windings comprise three-phase or single-phase windings.

6. The suspension of claim 1, wherein the stator assembly further comprises a second set of stator windings disposed along the other one of the inner cylindrical member or the outer cylindrical member.

7. The suspension of claim 6, wherein the first inverter is further configured to control current supplied from the energy storage device to energize the second set of stator windings independently from the current supplied to energize the first set of stator windings.

8. The suspension of claim 6, further comprising a second inverter configured to control current supplied from the energy storage device to energize the second set of stator windings independently from the current supplied to energize the first set of stator windings.

9. The suspension of claim 6, wherein the second set of stator windings comprise three-phase or single-phase windings.

10. A vehicle comprising:
    a suspension system, the suspension system comprising:
       a plurality of inner magnets coupled to an inner cylindrical member that defines a longitudinal axis, the plurality of inner magnets axially stacked on top of one another in an axial direction parallel to the longitudinal axis and comprising:
          a first set of inner magnets each having a first polarity; and
          a second set of inner magnets each having a second polarity different than the first polarity, the second set of inner magnets and the first set of inner magnets alternately arrayed in the axial direction;
       a plurality of outer magnets coupled to an outer cylindrical member that circumscribes the inner cylindrical member, the plurality of outer magnets axially stacked on top of one another in the axial direction and comprising:
   a first set of outer magnets each having the first polarity; and
   a second set of outer magnets each having the second polarity, the second set of outer magnets and the first set of outer magnets alternately arrayed in the axial direction;
a stator assembly comprising a first set of stator windings disposed along one of:
   the inner cylindrical member, the first set of stator windings when disposed along the inner cylindrical member separated from the inner magnets by a radial flux gap; or
   the outer cylindrical member, the first set of stator windings when disposed along the outer cylindrical member separated from the outer magnets by a radial flux gap; and
a first inverter configured to control current supplied from an energy storage device to energize the first set of stator windings to provide an active suspension mode for damping high-frequency vibrations caused by displacements between the inner cylindrical member and the outer cylindrical member in the axial direction,
wherein each inner magnet in the first set of inner magnets is radially aligned with a respective outer magnet in the second set of outer magnets and each inner magnet in the second set of inner magnets is radially aligned with a respective outer magnet in the first set of outer magnets to provide an attractive electromagnetic field between the inner and outer magnets that resists movement of inner cylindrical member relative to the outer cylindrical member in the axial direction.

11. The vehicle of claim 10, wherein the inner cylindrical member is coupled to one of a sprung mass of the vehicle or an un-sprung mass of the vehicle and the outer cylindrical member is coupled to the other one of the sprung mass or the un-sprung mass.

12. The vehicle of claim 11, wherein the sprung mass comprises a body member of the vehicle and the un-sprung mass comprises a wheel of the vehicle.

13. The vehicle of claim 10, wherein:
   each corresponding inner magnet defines a ring-shape having an inner cylindrical surface radially opposing an outer periphery of the inner cylindrical member, and an outer cylindrical surface; and
   each corresponding outer magnet defines a ring-shape having an inner cylindrical surface radially opposing the outer cylindrical member, and an outer cylindrical surface, the inner cylindrical surface of the corresponding outer magnet radially opposing the outer cylindrical surface of the respective inner magnet in the first set of inner magnets or the second set of inner magnets that is radially aligned with the corresponding outer magnet.

14. The vehicle of claim 10, wherein the first set of stator windings comprise three-phase or single-phase windings.

15. The vehicle of claim 10, wherein the stator assembly further comprises a second set of stator windings disposed along the other one of the inner cylindrical member or the outer cylindrical member.

16. The vehicle of claim 15, wherein the first inverter is further configured to control current supplied from the energy storage device to energize the second set of stator windings independently from the current supplied to energize the first set of stator windings.

17. The vehicle of claim 15, wherein the suspension system further comprises a second inverter configured to control current supplied from the energy storage device to energize the second set of stator windings independently from the current supplied to energize the first set of stator windings.

18. The vehicle of claim 15, wherein the second set of stator windings comprise three-phase or single-phase windings.

* * * * *